United States Patent
Jurbergs et al.

(10) Patent No.: US 6,519,382 B1
(45) Date of Patent: Feb. 11, 2003

(54) FRUSTRATED TOTAL INTERNAL REFLECTION SWITCH USING WAVEGUIDES AND METHOD OF OPERATION

(75) Inventors: David C. Jurbergs, Fort Worth, TX (US); Chris Karaguleff, Austin, TX (US)

(73) Assignee: Optical Switch Corporation, Richardson, TX (US)

( * ) Notice: Subject to any disclaimer, the term of this patent is extended or adjusted under 35 U.S.C. 154(b) by 241 days.

(21) Appl. No.: 09/658,902

(22) Filed: Sep. 11, 2000

(51) Int. Cl.[7] .............................. G02B 6/35; G02B 6/26
(52) U.S. Cl. ........................ 385/18; 385/31; 385/16; 385/20
(58) Field of Search ................... 385/18, 16, 12, 385/21, 31, 47, 20, 17, 19, 22, 23, 24, 14, 2, 40; 359/247, 222; 356/477

(56) References Cited

U.S. PATENT DOCUMENTS

| 4,121,884 | A |   | 10/1978 | Greenwood | 385/16 |
|---|---|---|---|---|---|
| 4,504,121 | A |   | 3/1985 | Carlsen et al. | 359/247 |
| 4,634,239 | A |   | 1/1987 | Buhrer | 385/18 |
| 5,031,987 | A |   | 7/1991 | Norling | 385/12 |
| 5,221,987 | A |   | 6/1993 | Laughlin | 359/222 |
| 5,225,887 | A |   | 7/1993 | Lipson et al. | 356/477 |
| 5,369,718 | A |   | 11/1994 | Kamata et al. | 385/21 |
| 5,444,801 | A |   | 8/1995 | Laughlin | 385/16 |
| 5,553,175 | A |   | 9/1996 | Laughlin | 385/16 |
| 5,555,327 | A |   | 9/1996 | Laughlin | 385/16 |
| 5,555,558 | A |   | 9/1996 | Laughlin | 385/16 |
| 5,566,260 | A |   | 10/1996 | Laughlin | 385/16 |
| 5,647,033 | A |   | 7/1997 | Laughlin | 385/16 |
| 5,732,168 | A |   | 3/1998 | Donald | 385/16 |
| 5,828,799 | A |   | 10/1998 | Donald | 385/16 |
| 5,841,916 | A |   | 11/1998 | Laughlin | 385/16 |
| 5,875,271 | A |   | 2/1999 | Laughlin | 385/16 |
| 5,909,301 | A |   | 6/1999 | Laughlin | 359/222 |
| 5,917,641 | A |   | 6/1999 | Laughlin | 359/222 |
| 6,137,930 | A | * | 10/2000 | Laughlin | 385/31 |
| 6,236,778 | B1 | * | 5/2001 | Laughlin | 385/22 |
| 6,236,787 | B1 | * | 5/2001 | Laughlin | 385/43 |
| 6,243,511 | B1 | * | 6/2001 | Laughlin | 356/128 |
| 6,253,007 | B1 | * | 6/2001 | Laughlin | 385/33 |
| 6,393,174 | B1 | * | 5/2002 | Karaguleff et al. | 385/16 |
| 6,393,175 | B1 | * | 5/2002 | Jurbergs et al. | 385/16 |
| 6,438,283 | B1 | * | 5/2002 | Karaguleff et al. | 385/16 |
| 6,453,084 | B1 | * | 5/2002 | Jurbergs et al. | 385/16 |
| 6,433,911 | B1 | * | 8/2002 | Chen et al. | 359/222 |
| 6,445,854 | B1 | * | 8/2002 | Chen et al. | 359/222 |

* cited by examiner

*Primary Examiner*—Georgia Epps
*Assistant Examiner*—Omar Hindi
(74) *Attorney, Agent, or Firm*—Baker Botts L.L.P.

(57) ABSTRACT

An optical switch for processing an optical signal includes an input waveguide having a reflective surface, a first output waveguide coupled to the input waveguide, and a second output waveguide. The second output waveguide has a first position spaced apart from the reflective surface of the input waveguide such that the reflective surface totally internally reflects an optical signal toward the first output waveguide. The second output waveguide has a second position in proximal contact with the reflective surface to frustrate the total internal reflection of the optical signal such that the second output waveguide receives the optical signal.

51 Claims, 10 Drawing Sheets

FRUSTRATED TOTAL INTERNAL REFLECTION SWITCH USING WAVEGUIDES AND METHOD OF OPERATION

TECHNICAL FIELD OF THE INVENTION

This invention relates to the field of frustrated total internal reflection devices and more particularly to a frustrated total internal reflection switch using waveguides.

BACKGROUND OF THE INVENTION

Fiber-optic communication systems include optical components, such as optical fibers coupled to switching components, that receive, transmit, and otherwise process information in optical signals. The switching components in a fiber-optic communication system selectively direct the information carried by the optical signal to one or more other optical components. A problem with optical switches for existing fiber-optic communication systems is that they require many complex optical components to perform the switching function. This adds to the cost and size of the fiber-optic communication system. It also leads to slower switching speeds and difficulties with aligning the switching components.

SUMMARY OF THE INVENTION

A frustrated total internal reflection switch using waveguides is provided that substantially eliminates or reduces disadvantages and problems associated with previous optical switches.

In accordance with one embodiment of the present invention, an optical switch for processing an optical signal includes an input waveguide having a reflective surface, a first output waveguide coupled to the input waveguide, and a second output waveguide. The second output waveguide has a first position spaced apart from the reflective surface of the input waveguide such that the reflective surface totally internally reflects an optical signal toward the first output waveguide. The second output waveguide also has a second position in proximal contact with the reflective surface to frustrate the total internal reflection of the optical signal such that the second output waveguide receives the optical signal.

Another embodiment of the present invention is a method for processing an optical signal that includes communicating an optical signal in a first waveguide and totally internally reflecting the optical signal at a reflective surface of the first waveguide toward a second waveguide. The method continues by placing a third waveguide in proximal contact with the first waveguide to frustrate the total internal reflection of the optical signal. The method concludes by receiving the optical signal in the third waveguide.

Yet another embodiment of the present invention is an optical switch for processing an optical signal that includes an input waveguide having a reflective surface, a first output waveguide coupled to the input waveguide, a second output waveguide, and a switching waveguide. The switching waveguide has a first position spaced apart from the reflective surface of the input waveguide such that the reflective surface totally internally reflects an optical signal toward the first output waveguide. The switching waveguide also has a second position in proximal contact with the reflective surface to frustrate the total internal reflection of the optical signal such that the switching waveguide communicates the optical signal toward the second output waveguide.

Technical advantages of the present invention include a frustrated total internal reflection optical switch that switches one or more optical signals using waveguides. By using waveguides to guide an optical signal to the switching region and to perform the switching operation, the present invention eliminates the need for costly and sometimes complex optical components. This results in a smaller packing density for the optical switch of the present invention and a more efficient, faster switching operation.

While in a switched state, the contact surface of a waveguide is typically placed in proximal contact with a reflective surface of another waveguide to frustrate the total internal reflection of the optical signal. A small portion of the optical signal may be reflected, however, at the reflective surface and processed as though the switch is operating in the unswitched state. This undesired result is one source of a crosstalk signal in the system.

Another technical advantage provided by the present invention is that the optical switch reduces the effects of a crosstalk signal generated by the above-identified reflection. In particular, the optical switch of the present invention processes any crosstalk signals so that a large portion of a crosstalk signal is not received by an optical component of the optical switch. The negative effects of a crosstalk signal are thereby reduced.

For example, in the switched state, an undesired crosstalk signal resulting from residual reflection at the FTIR interface between a reflective surface and a contact surface is further processed by a return-loop waveguide to reduce the crosstalk signal intensity. In particular, the crosstalk signal radiation is conveyed by the return-loop waveguide to a second FTIR interface within the output waveguide signal path. In the switched state this second FTIR waveguide interface frustrates the total internal reflection of the crosstalk signal at the reflective surface of the output waveguide. As a result, the small, undesired residual portion of the original optical signal undergoes further reduction in its intensity at this second FTIR interface. Therefore, only a negligible portion of the original optical signal, if any, comprises a crosstalk signal that may actually reach an optical component of the switch. Thus, the crosstalk signal is dissipated and its effects become negligible. The reduction in the magnitude of the crosstalk signal in the present invention will be referred to as a crosstalk improvement.

Another important advantage of the optical switch relates to the crosstalk improvement described above. Generally, the crosstalk signal described above is generated as a result of imperfections in the components of the optical switch, such as imperfections in the reflective and contact surfaces of the waveguides, or in less than ideal actuator performance which results in a slight air gap at the interface between the reflective and contact surfaces of the waveguides. By reducing the magnitude of crosstalk signals to acceptable levels during the operation of the optical switch using the return-loop waveguide, as described above, manufacturing tolerances for the components used in the switch may be increased, and components are thus easier and less costly to manufacture. For example, the reflective and contact surfaces of the waveguides may be constructed with increased surface roughness and still meet industry standards in minimizing crosstalk. Also, components having a greater degree of environmental contamination can be used, and still provide acceptable crosstalk performance during the operation of the switch.

In addition to supporting increased manufacturing tolerances for optical components, the use of the return-loop waveguides of the present invention allows actuator performance requirements to be relaxed. For example, the degree of proximal contact to which the actuator brings the reflective and contact surfaces of the waveguides may be relaxed and still provide acceptable crosstalk performance during the operation of the switch.

Other technical advantages are readily apparent to one skilled in the art from the following figures, descriptions, and claims.

BRIEF DESCRIPTION OF THE DRAWINGS

For a more complete understanding of the present invention and its advantages, reference is now made to the following description taken in conjunction with the accompanying figures in which like reference numbers indicate like features and wherein.

DETAILED DESCRIPTION OF THE INVENTION

Figure 1A:
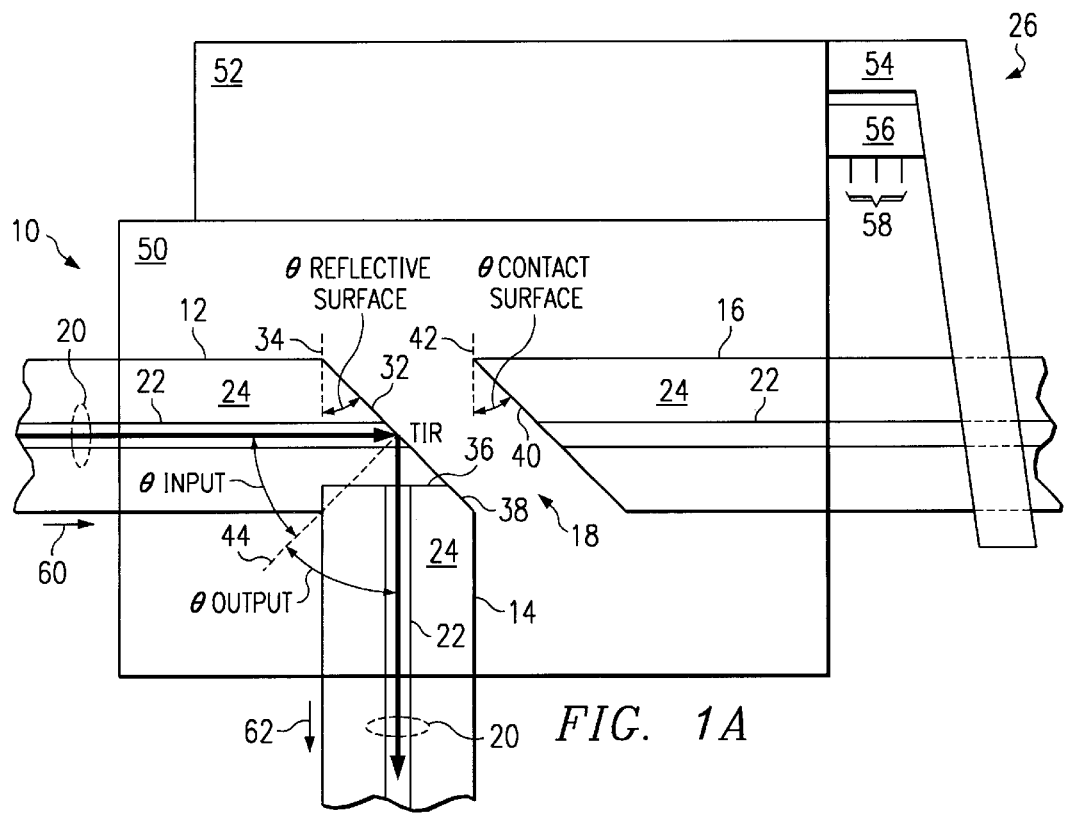
FIG. 1A illustrates a 1×2 embodiment of an optical switch operating in an unswitched mode in accordance with the present invention.
Figure 1B:
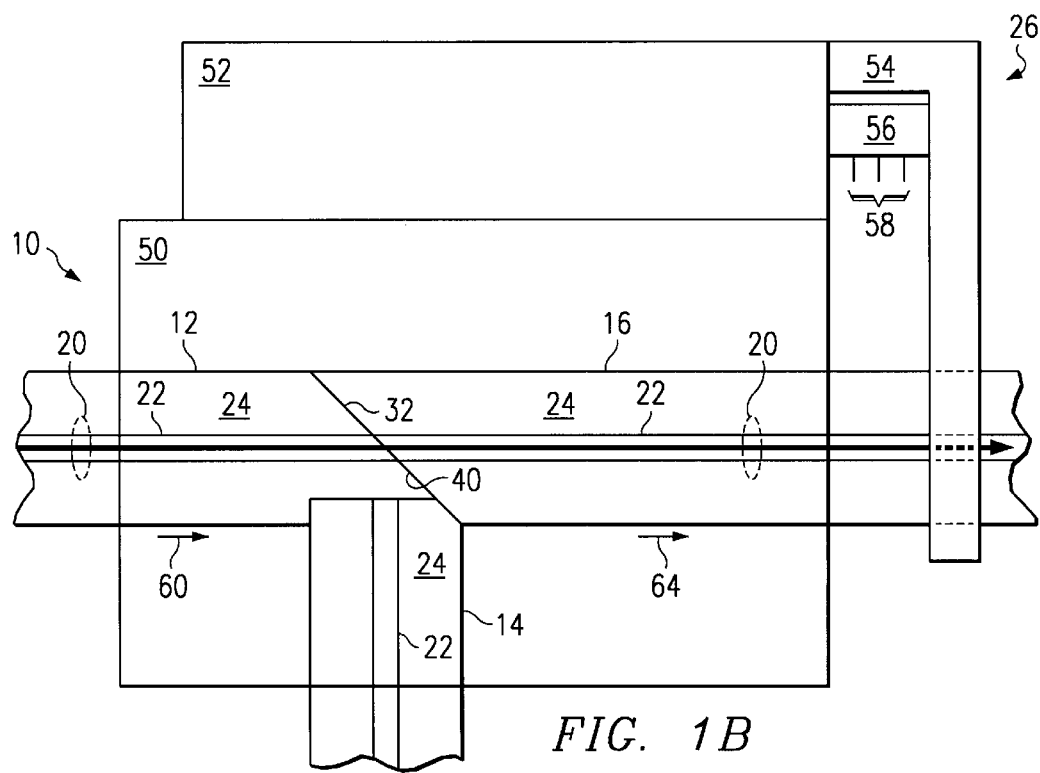
FIG. 1B illustrates the 1×2 embodiment of the optical switch operating in a switched mode.

FIGS. 1A and 1B illustrate one embodiment of a frustrated total internal reflection (FTIR) optical switch 10 that includes an input waveguide 12, an output waveguide 14, an output waveguide 16, and a fractive material 18 disposed between waveguides 12 and 16. In general, optical switch 10 receives an optical signal 20 and selectively communicates signal 20 to output waveguide 14 and/or output waveguide 16 based upon the position of output waveguide 16. In this respect, FIGS. 1A and 1B illustrate a 1×2 optical switch 10.

Waveguides 12, 14 and 16 each comprise an optical waveguide formed by any arrangement of suitable optically transmissive material that communicates optical signal 20 as a guided wave of energy. In one embodiment of switch 10, waveguides 12, 14 and 16 each comprise optical fibers (referred to generally as input optical fiber 12, and output optical fibers 14 and 16) that include a core 22 designed to transmit or receive information in the form of light pulses, and a cladding 24 that surrounds core 22 to prevent signal 20 from escaping core 22 during transmission. In another embodiment of switch 10, waveguides 12–16 each comprise a planar waveguide formed in an appropriate refractive material. Optical signal 20 comprises visible light, infrared radiation, ultra-violet radiation, or any other suitable optical beam.

Each core 22 of optical fibers 12–16 comprises any suitable refractive material, such as glass, having a particular index of refraction. Each cladding 24 of optical fibers 12–16 comprises any suitable refractive material, such as glass, having an index of refraction lower than that of the corresponding core 22 such that signal 20 propagates along the longitudinal axis of an optical fiber 12–16. Optical fibers 12–16 may comprise a multi-mode fiber having a large core (e.g., 50 or 62.5 microns wide) or a single mode fiber having a small core (e.g., 9 microns wide). Although the following description is detailed with reference to fibers 12–16 having a circular cross-section, it should be understood that the cross-section of optical fibers 12–16 may have any suitable shape, including, but not limited to, an oval or a circle having grooves or notches.

Input optical fiber 12 comprises reflective surface 32 at a bias angle, such as $\Theta_{reflective\ surface}$, measured with respect to a plane 34 that is normal to the longitudinal axis of fiber 12. Reflective surface 32 forms an interface between optical fiber 12 and refractive material 18. In one embodiment of switch 10, a portion of cladding 24 of fiber 12 is cleaved, etched, lapped, polished, or otherwise removed to form a notch 36 so that optical fiber 14 may be positioned in closer proximity to core 22 of optical fiber 12. Output optical fiber 14 comprises a core 22 that may have an index of refraction substantially similar to that of core 22 of input optical fiber 12. In the embodiment of switch 10 where notch 36 is formed in fiber 12, fiber 14 includes a facet 38 at a bias angle substantially similar to the bias angle of reflective surface 32.

Output optical fiber 16 comprises a contact surface 40 at a bias angle, such as $\Theta_{Contact\ surface}$, measured with respect to a plane 42 that is normal to the longitudinal axis of fiber 16. The index of refraction of core 22 of fiber 16 is substantially similar to that of core 22 of optical fiber 12. Fiber 16 has a first position spaced apart from fiber 12 and a second position in proximal contact with fiber 12 to frustrate the total internal reflection of optical signal 20. The term "proximal contact" refers not only to direct contact between optical fibers 16 and 12, but also contemplates any spacing or partial contact between fibers to frustrate the total internal reflection of optical signal 20 to a desired degree. By controllably varying the spacing between fibers 12 and 16 to a desired degree, optical switch 10 may perform a beam-splitting or variable attenuation operation such that a desired portion of signal 20 is communicated to fiber 14 and the remaining portion of the signal 20 is communicated to fiber 16. In one embodiment, reflective surface 32 of fiber 12 is substantially parallel to contact surface 40 of fiber 16 when fiber 16 is placed in proximal contact with fiber 12 such that the longitudinal axis of fiber 12 is substantially aligned with the longitudinal axis of fiber 16.

Optical switch 10 communicates optical signal 20 to output optical fiber 14 when output optical fiber 16 is spaced apart from input optical fiber 12, as described with reference to FIG. 1A. When output optical fiber 16 is placed in proximal contact with input optical fiber 12, optical switch 10 communicates optical signal 20 to output optical fiber 16, as described in greater detail with reference to FIG. 1B.

Refractive material 18 comprises air or any other suitable substance that has an index of refraction lower than that of core 22 of optical fiber 12. Optical signal 20 contacts reflective surface 32 of fiber 12 at an input angle, such as $\Theta_{input}$, measured with respect to a plane 44 that is normal to reflective surface 32. Accordingly, if the input angle of signal 20 is equal to or above a critical angle of refraction associated with the interface between core 22 of fiber 12 and refractive material 18, then reflective surface 32 totally internally reflects optical signal 20 at an output angle, such as $\Theta_{output}$, measured with respect to plane 44. The output angle of signal 20 is generally determined based upon the input angle of signal 20. Reflective surface 32 of fiber 12 therefore reflects optical signal 20 by total internal reflection (TIR).

Actuator 26 generally comprises a piezoelectric device, a bimorph transducer, or any other suitable material that displaces output optical fiber 16 in response to an electrical, thermal, or otherwise appropriate control signal. Activating and deactivating actuator 26 coupled to output optical fiber 16 brings fiber 16 into and out of proximal contact with fiber 12.

In one embodiment, actuator 26 comprises a base 52 coupled to an aligning subassembly 50, and an arm 54 that couples output optical fiber 16 to base 52. Aligning subassembly 50 comprises any suitable material that holds and/or positions fibers 12–16 to support the switching operation. Fibers 12 and 14 may be bonded to aligning subassembly 50 to maintain a static position. Fiber 16 may be placed in a groove formed in aligning subassembly 50 such that fiber 16 may be moved into and out of proximal contact with fiber 12. Actuator 26 further comprises a piezoelectric material 56 that places fiber 16 in a selected one of the first or second positions using arm 54 in response to a control signal 58.

Arm 54 is coupled to fiber 16 such that arm 54 does not interfere with the propagation of signal 20.

In operation of optical switch 10 with output optical fiber 16 spaced apart from input optical fiber 12, as illustrated in FIG. 1A, fiber 12 communicates optical signal 20 through core 22 as indicated by arrow 60. Total internal reflection at reflective surface 32, the interface between core 22 of fiber 12 and refractive material 18, directs signal 20 through cladding 24 of fiber 12 and into core 22 of output optical fiber 14, as indicated by arrow 62. By placing output optical fiber 14 closer to core 22 of input optical fiber 12 using notch 36 of fiber 12 and facet 38 of fiber 14, switch 10 reduces the amount of cladding 24 through which optical signal 20 propagates from core 22 of fiber 12 to core 22 of fiber 14. In this respect, switch 10 reduces the divergence and, therefore, the insertion loss of optical signal 20. Moreover, switch 10 reduces any "lensing" effects.

Actuator 26 places second output optical fiber 16 in the second position such that contact surface 40 of fiber 16 is placed in proximal contact with reflective surface 32 of fiber 12. In operation of switch 10 with output optical fiber 16 placed in proximal contact with input optical fiber 12, as illustrated in FIG. 1B, fiber 12 communicates optical signal 20 through core 22 as indicated by arrow 60. Core 22 of fiber 16 having an index of refraction substantially similar to core 22 of fiber 12, frustrates the total internal reflection of optical signal 20 at reflective surface 32. As a result, core 22 of fiber 16 receives optical signal 20 from core 22 of fiber 12. Optical signal 20 propagates through fiber 16 in a direction indicated by arrow 64. Therefore, FIGS. 1A and 1B together illustrate the operation of switch 10 with output optical fiber 16 spaced apart from input optical fiber 12 and with output optical fiber 16 placed in proximal contact with input optical fiber 12, respectively.

By using waveguides 12–16 to guide optical signal 20 to the switching region and to perform the switching operation, switch 10 eliminates the need for costly and sometimes complex optical components. This results in a smaller packing density for optical switch 10 and a more efficient, faster switching operation. Furthermore, by using fewer components to perform the switching operation than prior switches, optical switch 10 reduces the insertion loss of optical signal 20.

Figure 2A:
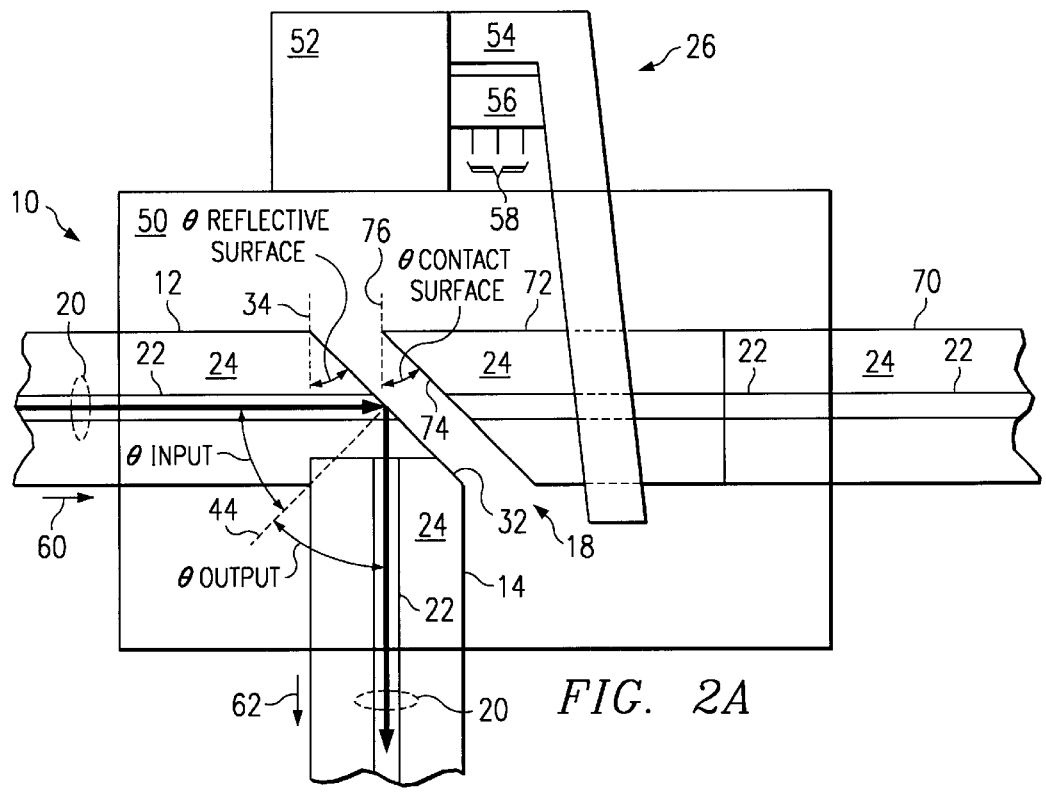
FIG. 2A illustrates a 1×2 embodiment of the optical switch using a switching waveguide to operate in an unswitched mode.
Figure 2B:
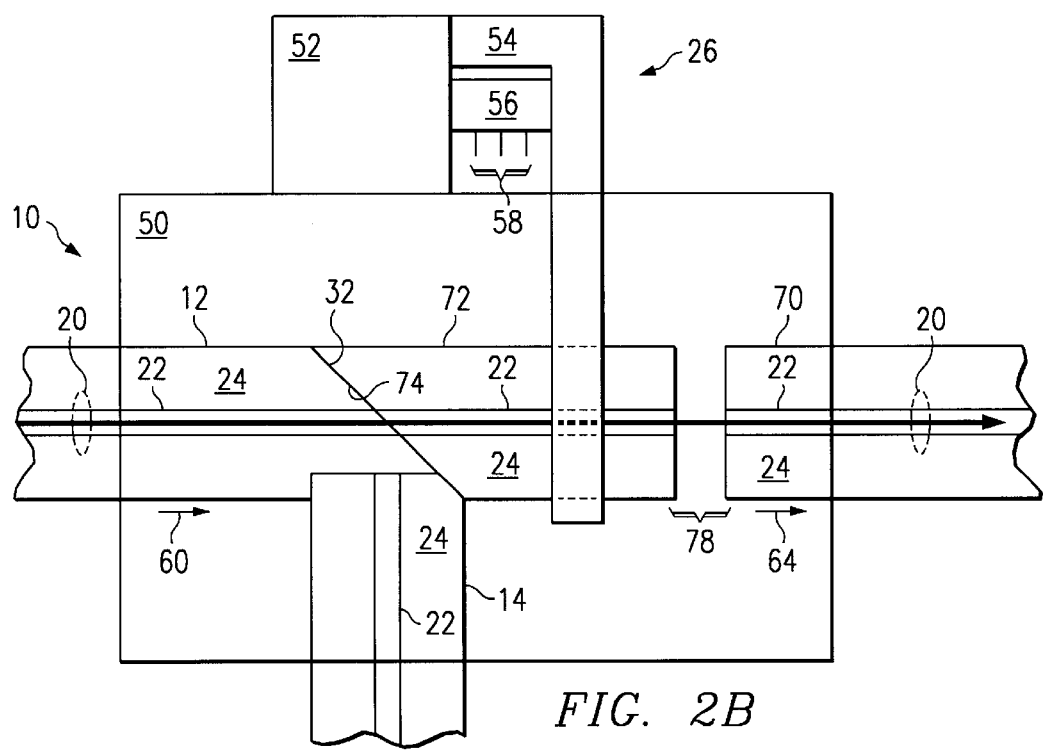
FIG. 2B illustrates the 1×2 embodiment of the optical switch using the switching waveguide to operate in a switched mode.

FIGS. 2A and 2B illustrate another 1×2 embodiment of optical switch 10 that includes input waveguide 12, output waveguide 14 coupled to waveguide 12, output waveguide 70, and a switching waveguide 72 coupled to actuator 26. In general, optical switch 10 receives optical signal 20 and selectively communicates signal 20 to output waveguide 14 and/or output waveguide 70 based upon the position of switching waveguide 72.

Each of waveguides 70 and 72 comprises an optical waveguide formed by any arrangement of suitable optically transmissive material that communicates optical signal 20 as a guided wave of energy. In one embodiment of switch 10, waveguides 70 and 72 each comprise optical fibers, referred to generally as output optical fiber 70 and switching optical fiber 72, that include a core 22 and a cladding 24. Core 22 of output optical fiber 70 and core 22 of switching optical fiber 72 each comprises any suitable refractive material, such as glass, that may have index of refractions substantially similar to that of core 22 of fiber 12. In another embodiment of switch 10, waveguides 70 and 72 each comprise a planar waveguide formed in an appropriate refractive material.

Switching optical fiber 72 comprises a contact surface 74 at a bias angle, such as $\Theta_{contact\ surface}$, measured with respect to a plane 76 that is normal to the longitudinal axis of fiber 72. Switching optical fiber 72 has a first position spaced apart from fiber 12 and a second position in proximal contact with fiber 12 to frustrate the total internal reflection of optical signal 20. By controllably varying the spacing between fibers 12 and 72 to a desired degree, optical switch 10 may perform a beam-splitting or variable attenuation operation such that a desired portion of signal 20 is communicated to fiber 14 and the remaining portion of the signal 20 is communicated to fiber 70. In one embodiment, reflective surface 32 of fiber 12 is substantially parallel to contact surface 74 of fiber 72 when fiber 72 is placed in proximal contact with fiber 12 such that the longitudinal axis of fiber 12 is substantially aligned with the longitudinal axis of fiber 72.

Optical switch 10 communicates optical signal 20 to output optical fiber 14 when switching optical fiber 72 is spaced apart from input optical fiber 12, as described with reference to FIG. 2A. When switching optical fiber 72 is placed in proximal contact with input optical fiber 12, optical switch 10 communicates optical signal 20 to output optical fiber 70, as described in greater detail with reference to FIG. 2B.

In operation of optical switch 10 with switching optical fiber 72 spaced apart from input optical fiber 12, as illustrated in FIG. 2A, fiber 12 communicates optical signal 20 through core 22 as indicated by arrow 60. Total internal refection at reflective surface 32 directs signal 20 through cladding 24 of fiber 12 and into core 22 of output fiber 14, as indicated by arrow 62.

Actuator 26 places switching optical fiber 72 in the second position such that contact surface 74 of fiber 72 is placed in proximal contact with reflective surface 32 of fiber 12. In operation of switch 10 with fiber 72 placed in proximal contact with fiber 12, as illustrated in FIG. 2B, fiber 12 communicates optical signal 20 through core 22 as indicated by arrow 60. Core 22 of fiber 72 having an index of refraction substantially similar to core 22 of fiber 12, frustrates the total internal reflection of optical signal 20 at reflective surface 32. As a result, core 22 of fiber 72 receives optical signal 20 from core 22 of fiber 12. Optical signal 20 traverses gap 78 from core 22 of switching optical fiber 72 to core 22 of output optical fiber 70. Core 22 of output optical fiber 70 communicates optical signal 20 for further processing. Therefore, FIGS. 2A and 2B together illustrate the operation of another embodiment of optical switch 10 using switching optical fiber 72.

Figure 3A:
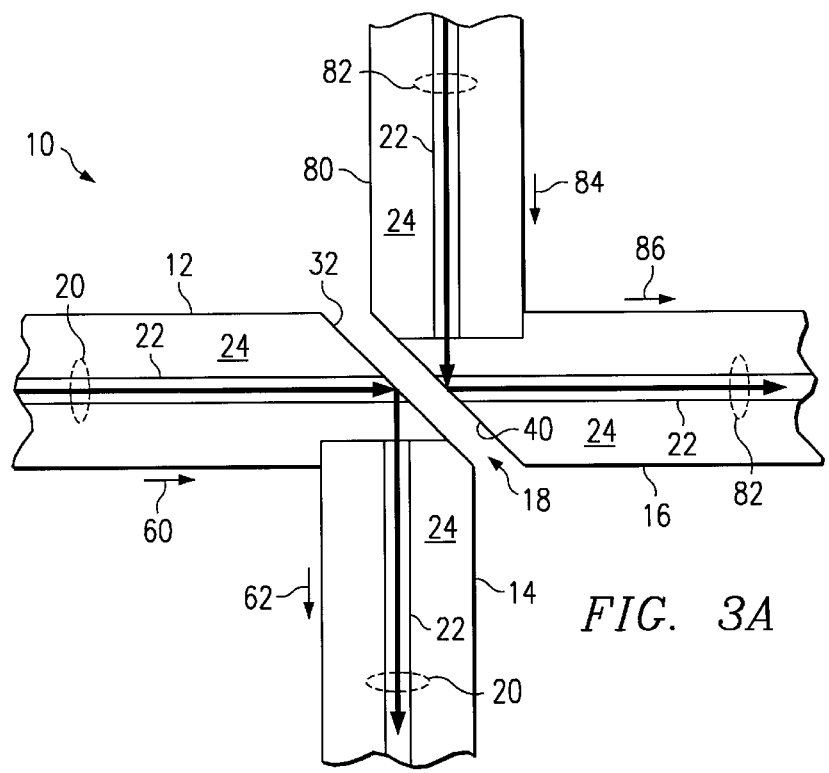
FIG. 3A illustrates a 2×2 embodiment of the optical switch operating in an unswitched mode.
Figure 3B:
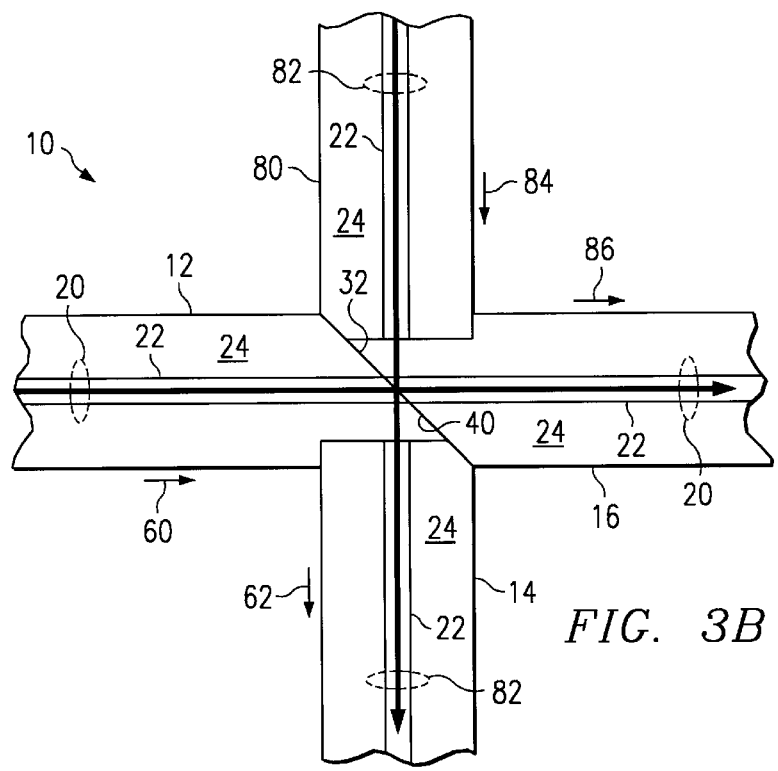
FIG. 3B illustrates the 2×2 embodiment of the optical switch operating in a switched mode.

FIGS. 3A and 3B illustrate another embodiment of optical switch 10 that includes input waveguide 12, output waveguide 14 coupled to waveguide 12, output waveguide 16, and a second input waveguide 80 coupled to waveguide 16. In general, optical switch 10 receives optical signal 20 and selectively communicates signal 20 to output waveguide 14 and/or output waveguide 16 based upon the position of output waveguide 16. Furthermore, optical switch 10 also receives an optical signal 82 and selectively communicates signal 82 to output waveguide 14 and/or output waveguide 16 based upon the position of output waveguide 16. In this respect, FIGS. 3A and 3B illustrate a 2×2 optical switch 10.

Waveguide 80 comprises an optical waveguide formed by any arrangement of suitable optically transmissive material that communicates optical signal 82 as a guided wave of energy. In one embodiment of switch 10, waveguide 80 comprises an optical fiber (referred to generally as input optical fiber 80) that includes a core 22 and a cladding 24. In another embodiment of switch 10, waveguide 80 comprises a planar waveguide formed in an appropriate refractive material. Optical signal 82 comprises visible light, infrared radiation, ultra-violet radiation, or any other suitable optical beam. Optical switch 10 communicates signal 20 to fiber 14 and communicates signal 82 to fiber 16 when fiber 16 is spaced apart from fiber 12, as described with reference to FIG. 3A. When fiber 16 is placed in proximal contact with fiber 12, switch 10 communicates signal 20 to fiber 16 and communicates signal 82 to fiber 14, as described in greater detail with reference to FIG. 3B.

In operation of switch 10 with fiber 16 spaced apart from fiber 12, as illustrated in FIG. 3A, total internal reflection at reflective surface 32 directs signal 20 into core 22 of fiber 14 as described above with reference to FIG. 1A. Fiber 80 communicates optical signal 82 through core 22 as indicated by arrow 84. Total internal reflection at contact surface 40 of fiber 16 directs signal 82 into core 22 of fiber 16, as indicated by arrow 86.

In operation of switch 10 with fiber 16 placed in proximal contact with fiber 12, as illustrated in FIG. 3B, fiber 16 receives signal 20 as a result of frustrated total internal reflection of signal 20 at reflective surface 32 as described above with reference to FIG. 1B. Fiber 80 communicates optical signal 82 through core 22 as indicated by arrow 84. Core 22 of fiber 12 frustrates the total internal reflection of signal 82 at contact surface 40 of fiber 16. As a result, core 22 of fiber 14 receives optical signal 82 from core 22 of fiber 80. Therefore, FIGS. 3A and 3B together illustrate the operation of a 2×2 optical switch 10.

Figure 4A:
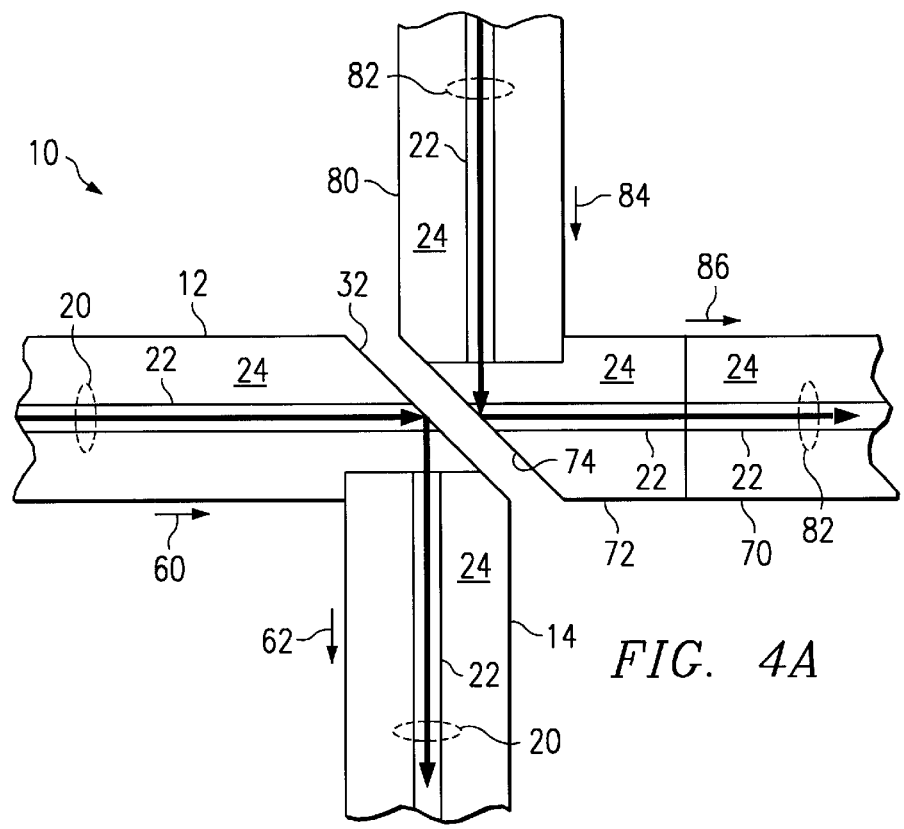
FIG. 4A illustrates a 2×2 embodiment of the optical switch using a switching waveguide to operate in an unswitched mode.
Figure 4B:
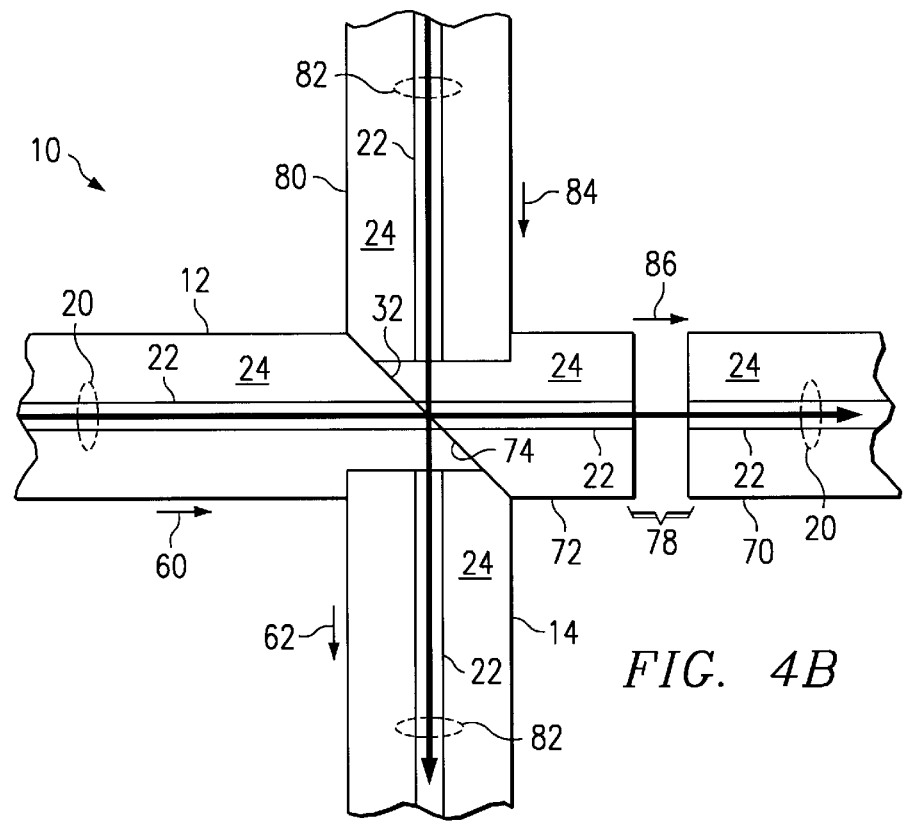
FIG. 4B illustrates the 2×2 embodiment of the optical switch using the switching waveguide to operate in a switched mode.

FIGS. 4A and 4B illustrate another embodiment of optical switch 10 that includes input waveguide 12, output waveguide 14 coupled to waveguide 12, output waveguide 70, switching waveguide 72, and second input waveguide 80 coupled to switching waveguide 72. In general, optical switch 10 receives optical signal 20 and selectively communicates signal 20 to output waveguide 14 and/or output waveguide 70 based upon the position of switching waveguide 72. Furthermore, optical switch 10 also receives optical signal 82 and selectively communicates signal 82 to output waveguide 14 and/or output waveguide 70 based upon the position of switching waveguide 72.

As described above, waveguides 12, 14, 70, 72, and 80 may comprise optical fibers. In operation of switch 10 with switching optical fiber 72 spaced apart from fiber 12, as illustrated in FIG. 4A, fiber 12 communicates optical signal 20 through core 22 as indicated by arrow 60. Total internal reflection at reflective surface 32 directs signal 20 into core 22 of fiber 14 as described above with reference to FIG. 2A. Fiber 80 communicates optical signal 82 through core 22 as indicated by arrow 84. Total internal reflection at contact surface 74 of switching optical fiber 72 directs signal 82 into core 22 of fiber 72 for communication to core 22 of fiber 70, as indicated by arrow 86.

In operation of switch 10 with switching optical fiber 72 placed in proximal contact with fiber 12, as illustrated in FIG. 4B, fiber 12 communicates optical signal 20 through core 22 as indicated by arrow 60. Switching optical fiber 70 receives optical signal 20 as a result of frustrated total internal reflection of signal 20 at reflective surface 32, as described above with reference to FIG. 2B. Signal 20 traverses gap 78 from core 22 of switching optical fiber 72 to core 22 of output optical fiber 70. Fiber 80 communicates optical signal 82 through core 22 as indicated by arrow 84. Core 22 of fiber 12 frustrates the total internal reflection of signal 82 at contact surface 74 of switching optical fiber 72. As a result, core 22 of fiber 14 receives signal 82 from core 22 of fiber 80. Therefore, FIGS. 4A and 4B together illustrate the operation of a 2×2 optical switch 10 using switching optical fiber 72.

Figure 5A:
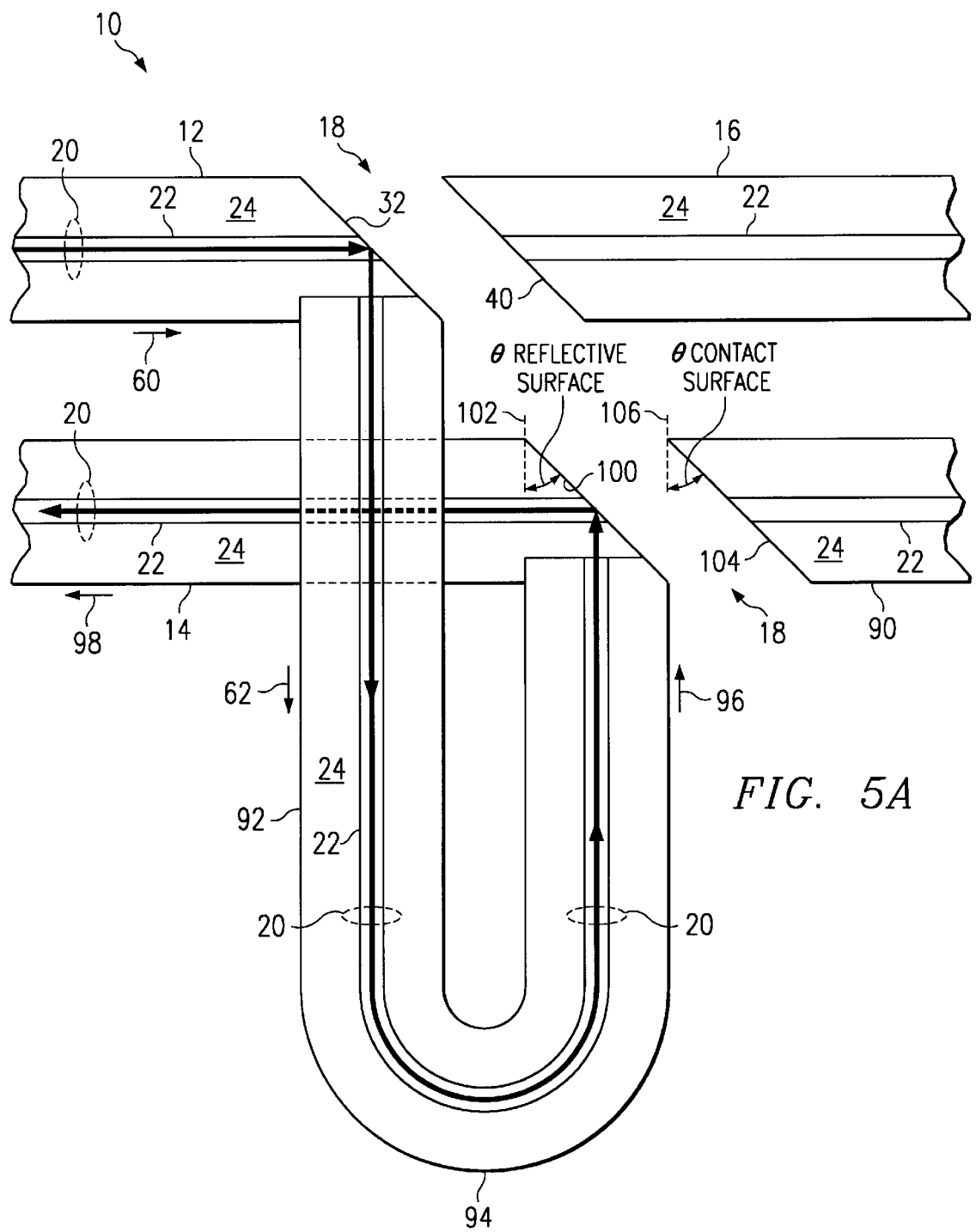
FIG. 5A illustrates a 1×2 embodiment of the optical switch using a return-loop waveguide to operate in an unswitched mode.
Figure 5B:
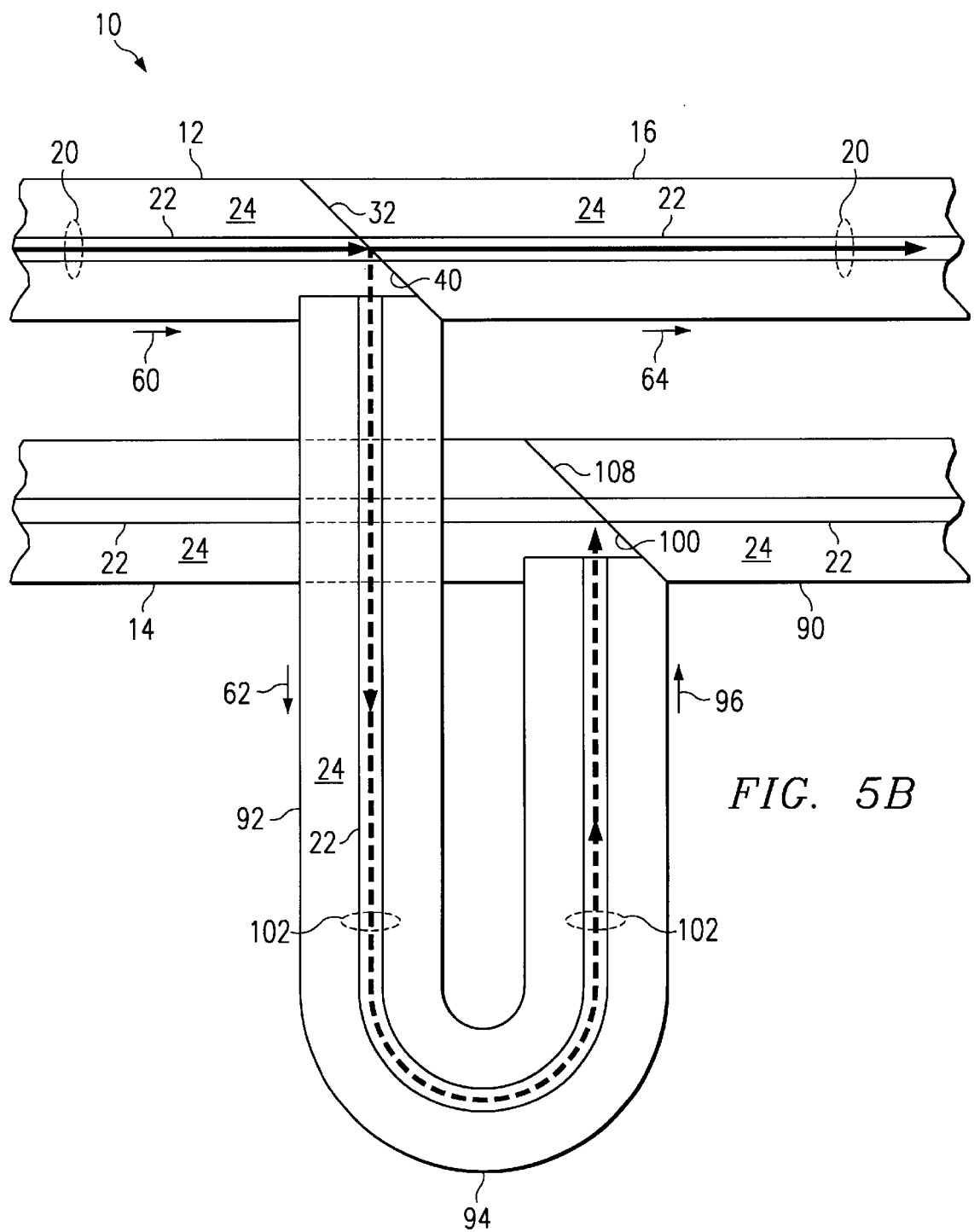
FIG. 5B illustrates the 1×2 embodiment of the optical switch using the return-loop waveguide to operate in a switched mode.

FIGS. 5A and 5B illustrate a 1×2 embodiment of optical switch 10 that minimizes a crosstalk signal. Optical switch 10 includes input waveguide 12, output waveguide 14, output waveguide 16, a switching waveguide 90, and a return-loop waveguide 92 coupled to waveguides 12 and 14. In general, optical switch 10 receives an optical signal 20 and selectively communicates signal 20 to output waveguide 14 and/or output waveguide 16 based upon the position of output waveguide 16.

Each of waveguides 90 and 92 comprises an optical waveguide formed by any arrangement of suitable optically transmissive material that communicates optical signal 20 as a guided wave of energy. In one embodiment of switch 10, switching waveguide 90 comprises an optical fiber that includes a core 22 and a cladding 24, and is generally referred to as switching optical fiber 90. In one embodiment, return-loop waveguide 92 comprises an optical fiber that includes a core 22 and a cladding 24 formed using a return-loop 94. In another embodiment, waveguide 92 comprises any number and configuration of optical fibers coupled together using a fusion splice, adhesives, or any other suitable coupling technology. In either embodiment, waveguide 92 is generally referred to as return-loop optical fiber 92. In yet another embodiment, each of waveguide 90 and return-loop waveguide 92 comprise a planar waveguide formed in an appropriate refractive material.

Output optical fiber 14 comprises a reflective surface 100 at a bias angle, such as $\Theta_{reflective\ surface}$, measured with respect to a plane 102 that is normal to the longitudinal axis of fiber 14. Optical fiber 90 comprises a contact surface 104 also at a bias angle, such as $\Theta_{contact\ surface}$, measured with respect to a plane 106 that is normal to the longitudinal axis of fiber 90. The index of refraction of core 22 of fiber 90 is substantially similar to that of core 22 of fiber 14.

Fiber 16 has a first position spaced apart from fiber 12 and a second position in proximal contact with fiber 12 to frustrate the total internal reflection of optical signal 20. Fiber 90 also has a first position spaced apart from fiber 14 and a second position in proximal contact with fiber 14 to frustrate the total internal reflection of any crosstalk signals associated with signal 20, as described in greater detail with reference to FIG. 5B. In one embodiment, fibers 16 and 90 are simultaneously placed in a selected one of the first positions and the second positions using a common actuator (not explicitly shown).

In operation of optical switch 10 with fibers 16 and 90 spaced apart from fibers 12 and 14, respectively, as illustrated in FIG. 5A, fiber 12 communicates optical signal 20 through core 22 as indicated by arrow 60. Total internal reflection at reflective surface 32 directs signal 20 through cladding 24 of fiber 12 and into core 22 of return-loop optical fiber 92, as indicated by arrow 62. Return-loop optical fiber 92 propagates optical signal 20 around return-loop 94 and in a direction indicated by arrow 96. Total internal reflection at reflective surface 100 of fiber 14 directs signal 20 into core 22 of fiber 14, as indicated by arrow 98.

In operation of switch 10 with fibers 16 and 90 placed in proximal contact with fibers 12 and 14, respectively, as illustrated in FIG. 5B, fiber 12 communicates optical signal 20 through core 22 as indicated by arrow 60. Core 22 of fiber 16 having an index of refraction substantially similar to core 22 of fiber 12, frustrates the total internal reflection of signal 20 at reflective surface 32. As a result, core 22 of fiber 16 receives almost all of signal 20 from core 22 of fiber 12. Ideally, contact surface 40 of fiber 16 frustrates the total internal reflection of the entire signal 20 at reflective surface 32 such that signal 20 is communicated into core 22 of fiber 16, as illustrated using a solid line for signal 20. Reflection of a small, residual portion of signal 20 at the interface between surfaces 32 and 40 may result in a crosstalk signal 102, as illustrated using a dashed line. A particular advantage provided by switch 10 illustrated in FIGS. 5A and 5B is that switch 10 minimizes the amount of crosstalk signal 102 that is received by fiber 14, or any other optical component of switch 10.

Referring to FIG. 5B, return-loop optical fiber 92 propagates crosstalk signal 102 as indicated by arrows 62 and 96. Core 22 of fiber 90 having an index of refraction substantially similar to core 22 of fiber 14, frustrates the total internal reflection of crosstalk signal 102 at reflective surface 100. Only a negligible residual portion of crosstalk signal 102 is directed by reflection into fiber 14. Almost all of crosstalk signal 102 is directed away from any of the optical components of switch 10. Therefore, switch 10 reduces the effects of crosstalk signal 102 and results in what is generally referred to as a crosstalk improvement.

Another technical advantage of the present invention relates to the crosstalk improvement described above. Generally, crosstalk signal 102 described above is generated as a result of imperfections in the components of optical switch 10, such as imperfections in surfaces 32 and 40 of fibers 12 and 16, respectively. The crosstalk signal 102 may also be the result of less than ideal actuation of fiber 16 which results in a slight air gap at the interface between surfaces 32 and 40. For example, if surfaces 32 and/or 40 are not manufactured with precise design tolerances, or if fiber 16 is not actuated ideally, contact surface 40 of fiber 16 does not frustrate the total internal reflection of the entire signal 20 when placed in proximal contact with reflective surface 32 of fiber 12. Crosstalk signal 102 may be generated as a result of these manufacturing defects and/or as a result of the less than ideal actuation of fiber 16.

By reducing the magnitude of crosstalk signal 102 to acceptable levels during the operation of optical switch 10 using return-loop optical fiber 92, manufacturing tolerances for the components used in switch 10 may be increased and the performance of switch 10 may still meet industry standards for low levels of crosstalk. The components of switch 10 can also use return-loop optical fiber 92 to overcome environmental contamination that leads to crosstalk signal 102 during the operation of switch 10. In addition to supporting increased manufacturing tolerances for the optical components of switch 10, the use of return-loop optical fiber 92 allows the actuation performance of switch 10 to be relaxed. For example, the degree of proximal contact to which fiber 16 is brought with respect to fiber 12 may be relaxed and still provide acceptable crosstalk performance during the operation of switch 10.

Figure 6A:
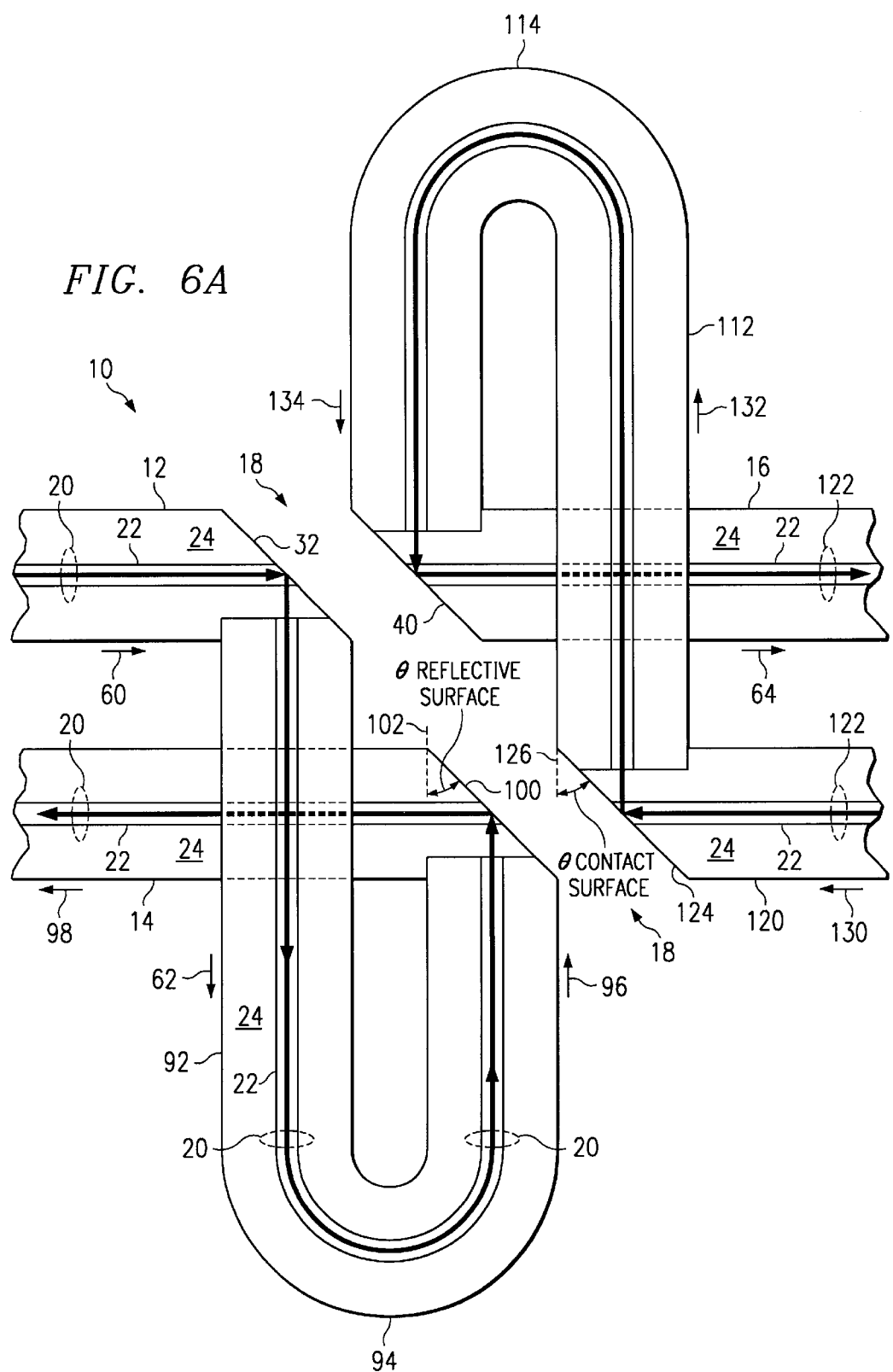
FIG. 6A illustrates a 2×2 embodiment of the optical switch using a return-loop waveguide to operate in an unswitched mode.
Figure 6B:
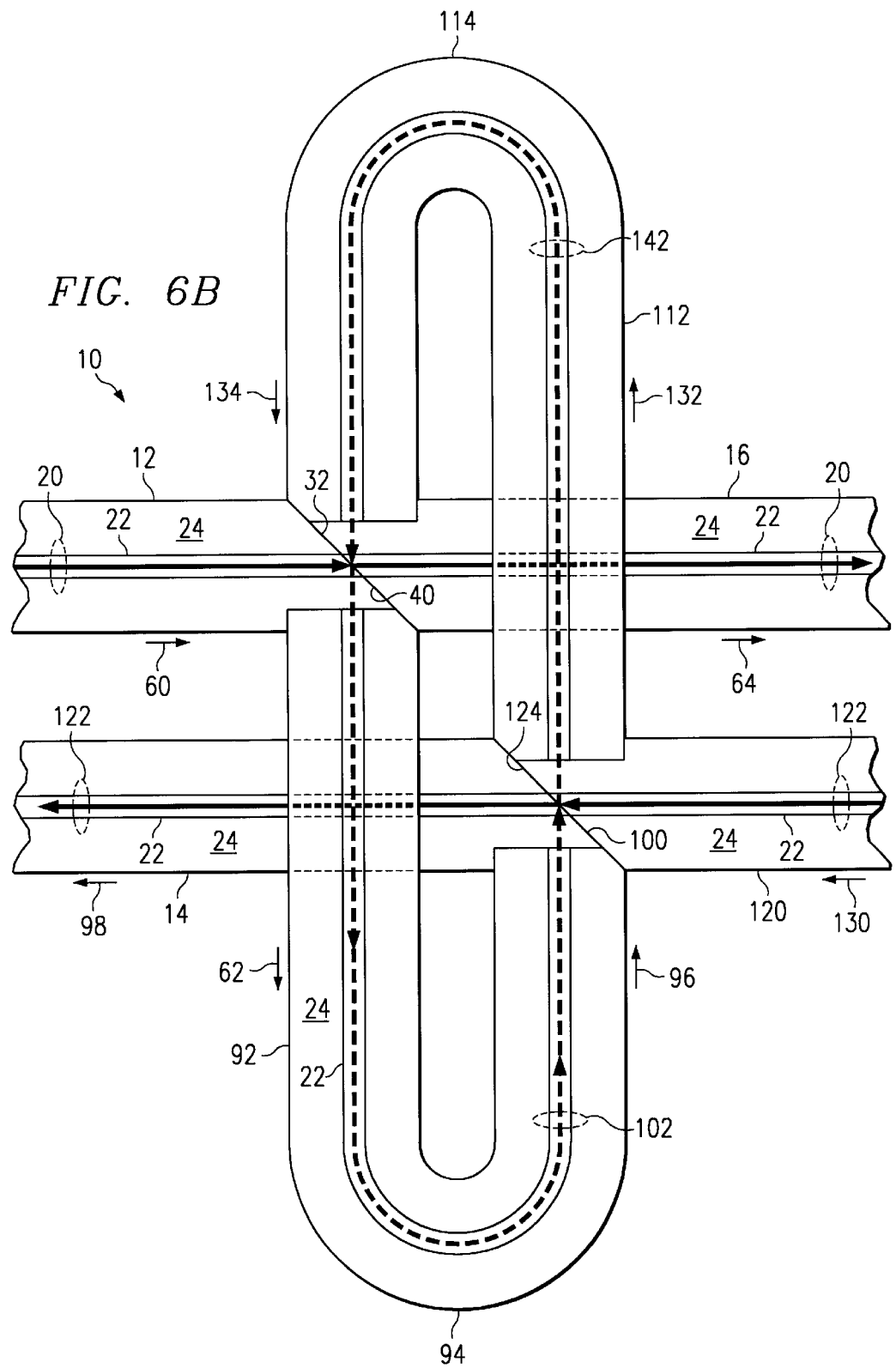
FIG. 6B illustrates a 2×2 embodiment of the optical switch using the return-loop waveguide to operate in a switched mode.

FIGS. 6A and 6B illustrate a 2×2 embodiment of optical switch 10 that minimizes crosstalk signals. Optical switch 10 comprises return-loop waveguide 92 that couples input waveguide 12 to output waveguide 14, and a return-loop waveguide 112 that couples output waveguide 16 to an input waveguide 120. In general, optical switch 10 receives an optical signal 20 and selectively communicates signal 20 to output waveguide 14 and/or output waveguide 16 based upon the position of output waveguide 16. Optical switch 10 also receives an optical signal 122 and selectively communicates signal 122 to output waveguide 14 and/or output waveguide 16 based upon the position of input waveguide 120. In this respect, FIGS. 6A and 6B illustrate a 2×2 optical switch 10 that minimizes crosstalk signals.

Each of return-loop waveguide 112 and input waveguide 120 comprises an optical waveguide formed by any arrangement of suitable optically transmissive material that communicates optical signal 122 as a guided wave of energy. In one embodiment of switch 10, waveguide 112 comprises an optical fiber that includes a core 22 and a cladding 24 formed using a return-loop 114. In another embodiment, waveguide 112 comprises any number and configuration of optical fibers coupled together using a fusion splice, adhesives, or any other suitable coupling technology. In either embodiment, waveguide 112 is generally referred to as return-loop optical fiber 112. In yet another embodiment of switch 10, each of return-loop waveguide 112 and input waveguide 120 comprises a planar waveguide formed in an appropriate refractive material. Optical signal 122 comprises visible light, infrared radiation, ultra-violet radiation, or any other suitable optical beam.

In one embodiment of optical switch 10, input waveguide 120 comprises an optical fiber that includes a core 22 and a cladding 24, and is generally referred to as input optical fiber 120. Input optical fiber 120 comprises a contact surface 124 at a bias angle, such as $\Theta_{contact\ surface}$, measured with respect to a plane 126 that is normal to the longitudinal axis of fiber 120. The index of refraction of core 22 of fiber 120 is substantially similar to that of core 22 of fiber 14. In one embodiment, reflective surface 100 of fiber 14 is substantially parallel to contact surface 124 of fiber 120 when fiber 120 is placed in proximal contact with fiber 14 such that the longitudinal axis of fiber 14 is substantially aligned with the longitudinal axis of fiber 120.

In operation of optical switch 10 with fibers 16 and 120 spaced apart from fibers 12 and 14, respectively, as illustrated in FIG. 6A, fiber 12 communicates optical signal 20 through core 22 as indicated by arrow 60. Total internal reflection at reflective surface 32 of fiber 12 directs signal 20 into core 22 of return-loop optical fiber 92, and total internal reflection at reflective surface 100 of fiber 14 directs signal 20 into core 22 of fiber 14 as described above with reference FIG. 5A. Fiber 120 communicates optical signal 122 through core 22 as indicated by arrow 130. Total internal reflection at contact surface 124 directs signal 122 through cladding 24 of fiber 120 and into core 22 of return-loop optical fiber 112, as indicated by arrow 132. Return-loop optical fiber 112 propagates optical signal 122 around return-loop 114 and in a direction indicated by arrow 134. Total internal reflection at contact surface 40 of fiber 16 directs signal 122 into core 22 of fiber 16, as indicated by arrow 64.

In operation of switch 10 with fibers 16 and 120 placed in proximal contact with fibers 12 and 14, respectively, as illustrated in FIG. 6B, fiber 12 communicates optical signal 20 through core 22 as indicated by arrow 60. Output optical fiber 16 receives optical signal 20 as a result of frustrated total internal reflection of signal 20 at reflective surface 32. Fiber 120 communicates optical signal 122 through core 22 as indicated by arrow 130. Core 22 of output optical fiber 14 frustrates the total internal reflection of signal 122 at contact surface 124 of fiber 120. As a result, core 22 of fiber 14 receives signal 122 from core 22 of fiber 120.

As described above with reference to crosstalk signal 102 in FIG. 5B, reflective surface 100 of fiber 14 ideally frustrates the total internal reflection of the entire signal 122 at contact surface 124 such that signal 122 is communicated into core 22 of fiber 14, as illustrated using a solid line for signal 122. Reflection of a small, residual portion of signal 122 at the interface between surfaces 100 and 124 results in a crosstalk signal 142. A particular advantage provided by switch 10 illustrated in FIGS. 6A and 6B is that switch 10 further processes crosstalk signal 142 so that a large portion of crosstalk signal 142 is not received by output optical fiber 16, or any other optical component of switch 10.

Referring to FIG. 6B, return-loop optical fiber 112 propagates crosstalk signal 142 as indicated by arrows 132 and 134. Core 22 of fiber 12 having an index of refraction substantially similar to core 22 of fiber 16, frustrates the total internal reflection of crosstalk signal 142 at contact surface 40. Only a negligible residual portion of crosstalk signal 142 is directed by reflection into fiber 16. Almost all of crosstalk signal 142 is directed away from any of the optical components of switch 10. In one embodiment, crosstalk signal 142 is directed into return-loop optical fiber 92 and propagates around return-loop optical fibers 92 and 112 until crosstalk signals 102 and 142 dissipate. Therefore, switch 10 reduces the effects of crosstalk signals 102 and 142. The crosstalk improvement associated with signals 102 and 142 results in the manufacturing and performance advantages described above with reference to FIGS. 5A and 5B.

Figure 7:
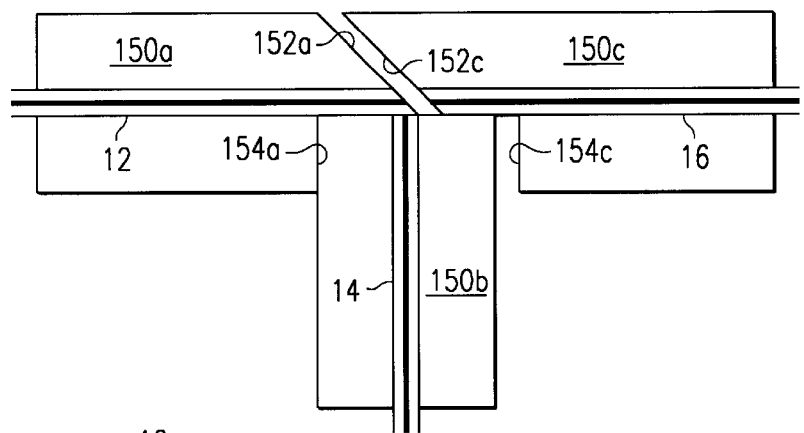
FIG. 7 illustrates an arrangement of waveguides of the optical switch.

FIG. 7 illustrates an arrangement of waveguides 12–16 of optical switch 10. Waveguides 12–16 may be bonded, glued, or otherwise adhered to aligning subassemblies 150a–c, respectively, generally referred to as aligning subassembly 150. Aligning subassembly 150 comprises any suitable material that holds and/or positions waveguides 12–16 to support the switching operation of switch 10. Aligning subassemblies 150 may be polished, cleaved, or otherwise configured to achieve angular endfaces 152a and 152c. Endfaces 152a and 152c are at a bias angle substantially similar to the bias angles of reflective surface 32 and contact surface 40 of waveguides 12 and 16, respectively. Aligning subassemblies 150 may also be configured to achieve notches 154a and 154c so that waveguide 14 may be positioned in closer proximity to waveguide 12. Although FIG. 7 is illustrated with aligning subassemblies 150a–c for waveguides 12–16, it should be understood that switch 10 may also use aligning subassemblies 50 for the arrangement of waveguides illustrated in FIGS. 2–6.

Figure 8A:
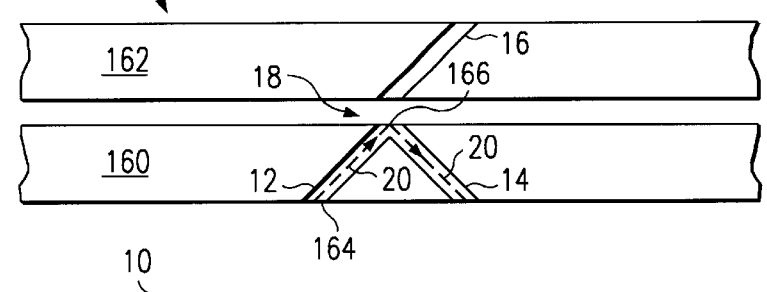
FIG. 8A illustrates a 1×2 embodiment of the optical switch using planar waveguides to operate in an unswitched mode.
Figure 8B:
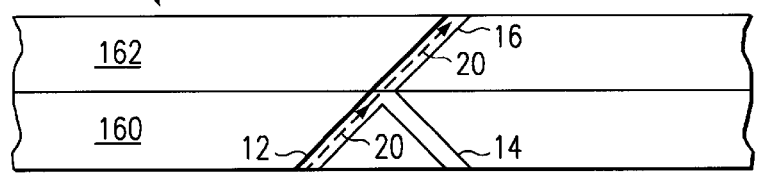
FIG. 8B illustrates a 1×2 embodiment of the optical switch using planar waveguides to operate in a switched mode.

FIGS. 8A–8B illustrate one embodiment of switch 10 in which waveguides 12–16 comprise planar waveguides formed in appropriate refractive materials 160 and 162. In general, optical switch 10 receives an optical signal 20 and selectively communicates signal 20 to output waveguide 14 and/or output waveguide 16 based upon the position of waveguide 16. In this respect, FIGS. 8A and 8B illustrate a 1×2 optical switch 10.

Each of refractive materials 160 and 162 comprise any suitable material having a particular index of refraction at a particular wavelength of optical signal 20. In one embodiment, materials 160 and 162 comprise silicon dioxide. Waveguides 12–16 each comprise an optical waveguide formed by any arrangement of suitable optically transmissive material. The materials used to form waveguides 12–16 in refractive materials 160 and 162 may be selected to provide particular indices of refraction that are higher than that of materials 160 and 162 such that waveguides 12–16 communicate signal 20 as a guided wave of energy. In this respect, each of waveguides 12–16 is operable to guide the flow of radiant energy along a path parallel to its axis and to contain the energy of signal 20 within or adjacent to its surface.

Refractive material 18 comprises air or any other suitable substance that has an index of refraction lower than that of waveguides 12–16. Accordingly, if optical signal 20 propagates through waveguide 12 and impinges upon second surface 166 at an angle equal to or above a critical angle of refraction associated with the interface between the waveguide 12 and material 18, then second surface 166 of waveguide 12 totally internally reflects optical signal 20. Second surface 166 of waveguide 12 therefore reflects optical signal 20 by total internal reflection (TIR), and may generally be referred to as a reflective surface 166.

In operation of optical switch 10 with output waveguide 16 in a first position spaced apart from input waveguide 12, as illustrated in FIG. 8A, waveguide 12 communicates optical signal 20 from first surface 164 to reflective surface 166. Total internal reflection at the interface between material 18 and reflective surface 166 of input waveguide 12 directs optical signal 20 to output waveguide 14.

In operation of switch 10 with output waveguide 16 in a second position placed in proximal contact with input waveguide 12, as illustrated in FIG. 8B, input waveguide 12 communicates optical signal 20 from first surface 164 to reflective surface 166. Output waveguide 16, having an index of refraction substantially similar to that of input waveguide 12, frustrates the total internal reflection of optical signal 20 at reflective surface 166. As a result, output waveguide 16 receives optical signal 20. Therefore, FIGS. 8A and 8B together illustrate the operation of switch 10 with output waveguide 16 spaced apart from input waveguide 12 and with output waveguide 16 placed in proximal contact with input waveguide 12, respectively.

Figure 9A:
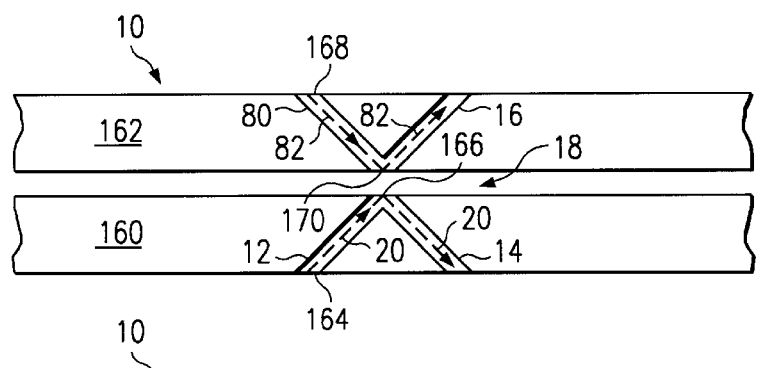
FIG. 9A illustrates a 2×2 embodiment of the optical switch using planar waveguides to operate in an unswitched mode.
Figure 9B:
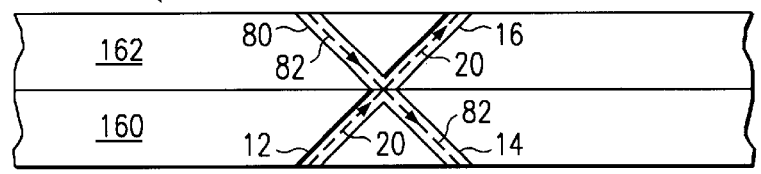
FIG. 9B illustrates a 2×2 embodiment of the optical switch using planar waveguides to operate in a switched mode.

FIGS. 9A and 9B illustrate another embodiment of optical switch 10 that includes input waveguide 12 and output waveguide 14 formed in refractive material 160, and output waveguide 16 and a second input waveguide 80 formed in refractive material 162. In general, optical switch 10 receives optical signal 20 and selectively communicates signal 20 to output waveguide 14 and/or output waveguide 16 based upon the position of output waveguide 16. Furthermore, optical switch 10 also receives an optical signal 82 and selectively communicates signal 82 to output waveguide 14 and/or output waveguide 16 based upon the position of output waveguide 14. In this respect, FIGS. 9A and 9B illustrate a 2×2 optical switch 10.

Waveguide 80 comprises an optical waveguide formed by any arrangement of suitable optically transmissive material having a particular index of refraction higher than that of material 162 such that waveguide 80 communicates signal 82 as a guided wave of energy. In this respect, waveguide 80 is operable to guide the flow of radiant energy along a path parallel to its axis and to contain the energy of signal 20 within or adjacent to its surface.

Refractive material 18 comprises air or any other suitable substance that has an index of refraction lower than that of waveguide 80. Accordingly, if optical signal 82 propagates through waveguide 80 and impinges upon second surface 170 at an angle equal to or above a critical angle of refraction associated with the interface between waveguide 80 and material 18, then second surface 170 of waveguide 80 totally internally reflects optical signal 82. Second surface 170 of waveguide 80 therefore reflects optical signal 82 by total internal reflection (TIR). It should be understood that second surface 170 of waveguide 80 also comprises a contact surface of waveguide 16. Therefore, second surface 170 may also be referred to as contact surface 170.

In operation of switch 10 with waveguide 16 spaced apart from waveguide 12 and waveguide 14 spaced apart from waveguide 80, as illustrated in FIG. 9A, total internal reflection at reflective surface 166 directs signal 20 into waveguide 14 as described above with reference to FIG. 8A. Waveguide 80 communicates optical signal 82 from first surface 168 to contact surface 170. Total internal reflection at contact surface 170 directs signal 82 into waveguide 16.

In operation of switch 10 with waveguide 16 placed in proximate contact with waveguide 12 and waveguide 14 placed in proximal contact with waveguide 80, as illustrated in FIG. 9B, waveguide 16 receives signal 20 as a result of frustrated total internal reflection of signal 20 at reflective surface 166 of waveguide 12, as described above with reference to FIG. 8B. Waveguide 80 communicates optical signal 82 from surface 168 to contact surface 170. Waveguide 14 having an index of refraction substantially similar to that of waveguide 80 frustrates the total internal reflection of signal 82 at contact surface 170. As a result, waveguide 14 receives optical signal 82 from waveguide 80. Therefore, FIGS. 9A and 9B together illustrate the operation of a 2×2 optical switch 10.

Figure 10A:
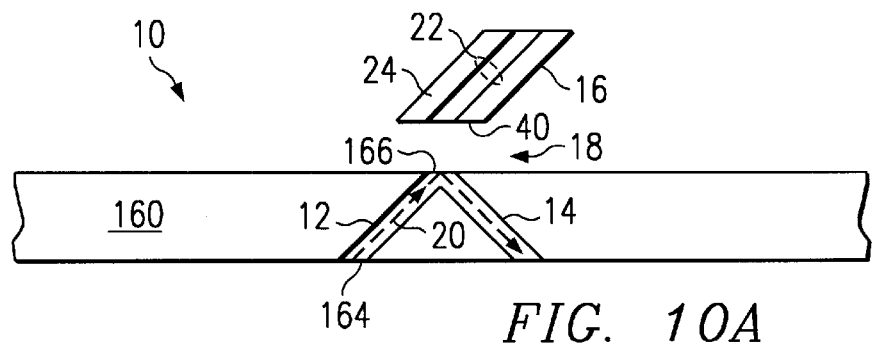
FIG. 10A illustrates a 1×2 embodiment of the optical switch using planar waveguides and optical fibers to operate in an unswitched mode.
Figure 10B:
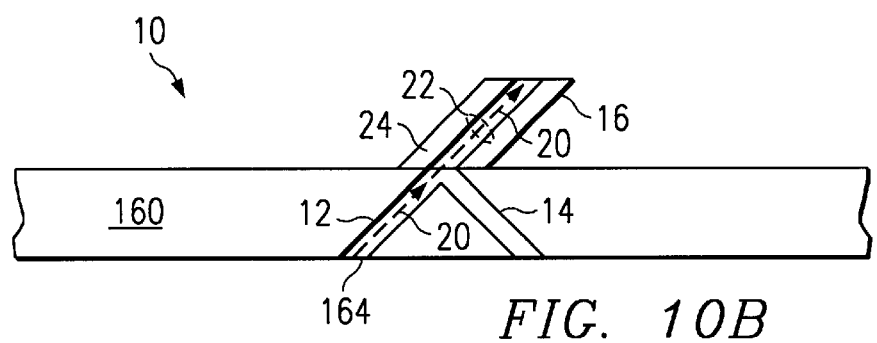
FIG. 10B illustrates a 1×2 embodiment of the optical switch using planar waveguides and optical fibers to operate in a switched mode.

FIGS. 10A–10B illustrate one embodiment of switch 10 in which waveguides 12 and 14 comprise planar waveguides formed in an appropriate refractive material 160, and waveguide 16 comprises an optical fiber 16 having a core 22 and a cladding 24. In general, optical switch 10 receives an optical signal 20 and selectively communicates signal 20 to output waveguide 14 and/or output optical fiber 16 based upon the position of fiber 16. In this respect, FIGS. 10A and 10B illustrate a hybrid 1×2 optical switch 10.

In operation of optical switch 10 with output optical fiber 16 in a first position spaced apart from input waveguide 12, as illustrated in FIG. 10A, waveguide 12 communicates optical signal 20 from first surface 164 to reflective surface 166. Total internal reflection at the interface between material 18 and reflective surface 166 of input waveguide 12 directs optical signal 20 to output waveguide 14.

In operation of switch 10 with output optical fiber 16 in a second position placed in proximal contact with input waveguide 12, as illustrated in FIG. 10B, input waveguide 12 communicates optical signal 20 from first surface 164 to reflective surface 166. Output optical fiber 16, having a core 22 with an index of refraction substantially similar to that of input waveguide 12, frustrates the total internal reflection of optical signal 20 at reflective surface 166. As a result, output optical fiber 16 receives optical signal 20. Therefore, FIGS. 10A and 10B together illustrate the operation of a hybrid 1×2 optical switch 10.

Figure 11A:
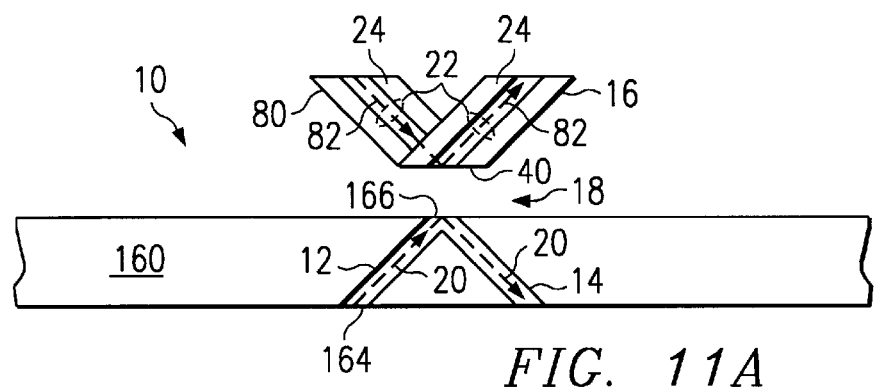
FIG. 11A illustrates a 2×2 embodiment of the optical switch using planar waveguides and optical fibers to operate in an unswitched mode.
Figure 11B:
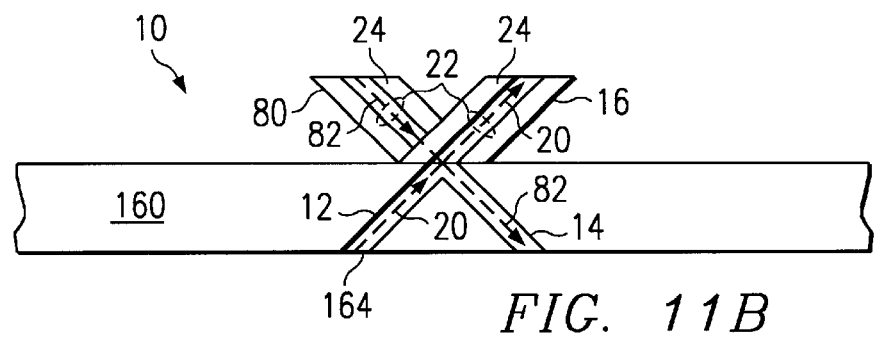
FIG. 11B illustrates a 2×2 embodiment of the optical switch using planar waveguides and optical fibers to operate in a switched mode.

FIGS. 11A and 11B illustrate another embodiment of optical switch 10 that includes input waveguide 12 and output waveguide 14 formed in refractive material 160, and output optical fiber 16 and a second input optical fiber 80. In general, optical switch 10 receives optical signal 20 and selectively communicates signal 20 to output waveguide 14 and/or output optical fiber 16 based upon the position of output optical fiber 16. Furthermore, optical switch 10 also receives an optical signal 82 and selectively communicates signal 82 to output waveguide 14 and/or output optical fiber 16 based upon the position of output waveguide 14. In this respect, FIGS. 11A and 11B illustrate a hybrid 2×2 optical switch 10.

In operation of switch 10 with output optical fiber 16 spaced apart from waveguide 12 and waveguide 14 spaced apart from input optical fiber 80, as illustrated in FIG. 11A, total internal reflection at reflective surface 166 directs signal 20 into waveguide 14 as described above with reference to FIG. 10A. Input optical fiber 80 communicates optical signal 82 through core 22 to contact surface 40 of fiber 16. Total internal reflection at contact surface 40 directs signal 82 into core 22 of fiber 16.

In operation of switch 10 with fiber 16 placed in proximate contact with waveguide 12 and waveguide 14 placed in proximal contact with fiber 80, as illustrated in FIG. 11B, fiber 16 receives signal 20 as a result of frustrated total internal reflection of signal 20 at reflective surface 166 of waveguide 12, as described above with reference to FIG. 10B. Fiber 80 communicates optical signal 82 through core 22 to contact surface 40. Waveguide 14 frustrates the total internal reflection of signal 82 at contact surface 40. As a result, waveguide 14 receives optical signal 82 from fiber 80. Therefore, FIGS. 11A and 11B together illustrate the operation of a hybrid 2×2 optical switch 10.

Although the present invention has been described with several embodiments, a myriad of changes, variations, alterations, transformations, and modifications may be suggested to one skilled in the art, and it is intended that the present invention encompasses such changes, variations, alterations, transformations, and modifications as fall within the spirit and scope of the appended claims.

What is claimed is:

1. An optical switch for processing an optical signal, comprising:
    an input waveguide having a reflective surface;
    a first output waveguide coupled to the input waveguide; and
    a second output waveguide having a first position spaced apart from the reflective surface of the input waveguide such that the reflective surface totally internally reflects an optical signal toward the first output waveguide, and the second output waveguide having a second position in proximal contact with the reflective surface to frustrate the total internal reflection of the optical signal such that the second output waveguide receives the optical signal.

2. The optical switch of claim 1, wherein the optical signal contacts the reflective surface at an input angle and the first output waveguide is operable to receive the optical signal at an output angle based upon the input angle.

3. The optical switch of claim 1, wherein the input waveguide comprises a longitudinal axis and the reflective surface is at an angle to a plane that is normal to the longitudinal axis.

4. The optical switch of claim 3, wherein the second output waveguide comprises a longitudinal axis and a contact surface that is substantially parallel to the reflective surface of the input waveguide, when the longitudinal axis of the second output waveguide is substantially aligned with the longitudinal axis of the input waveguide, the contact surface operable to contact proximally the reflective surface when the second output waveguide is placed in the second position.

5. The optical switch of claim 1, further comprising an actuator coupled to the second output waveguide and operable to position the second output waveguide in a selected one of the first position and the second position in response to a control signal.

6. The optical switch of claim 1, wherein the first output waveguide and the second output waveguide are arranged in two dimensions.

7. The optical switch of claim 1, wherein:
    the input waveguide comprises an input optical fiber;
    the first output waveguide comprises a first output optical fiber; and
    the second output waveguide comprises a second output optical fiber.

8. The optical switch of claim 7, wherein:
    the input optical fiber comprises a first core having a first index of refraction and a cladding having a second index of refraction lower than the first index of refraction, the first core operable to communicate the optical signal such that it contacts the reflective surface at an input angle; and
    the first output optical fiber comprises a second core operable to receive the optical signal at an output angle determined based upon the input angle and having a third index of refraction substantially similar to the first index of refraction.

9. The optical switch of claim 8, wherein a portion of the cladding of the first optical fiber is removed such that the second core is positioned proximal to first core.

10. The optical switch of claim 1, wherein the input waveguide comprises a first input waveguide and further comprising a second input waveguide coupled to the second output waveguide such that a contact surface of the second output waveguide totally internally reflects a second optical signal communicated by the second input waveguide when the second output waveguide is placed in the first position and such that the first output waveguide receives the second optical signal when the second output waveguide is placed in the second position.

11. The optical switch of claim 1, wherein:
    the input waveguide comprises a planar waveguide formed in a first refractive material;
    the first output waveguide comprises a planar waveguide formed in the first refractive material; and
    the second output waveguide comprises a planar waveguide formed in a second refractive material.

12. The optical switch of claim 11, wherein:
    the first refractive material has a first index of refraction;
    the input waveguide has a second index of refraction that is higher than the first index of refraction; and
    the second output waveguide has a third index of refraction substantially similar to the second index of refraction.

13. The optical switch of claim 10, wherein:
    the first input waveguide comprises a planar waveguide formed in a first refractive material;
    the first output waveguide comprises a planar waveguide formed in the first refractive material;
    the second input waveguide comprises a planar waveguide formed in a second refractive material; and
    the second output waveguide comprises a planar waveguide formed in the second refractive material.

14. The optical switch of claim 13, wherein:
    the second refractive material has a first index of refraction;
    the second input waveguide has a second index of refraction that is higher than the first index of refraction; and
    the first output waveguide has a third index of refraction substantially similar to the second index of refraction.

15. The optical switch of claim 10, wherein:
    the first input waveguide comprises a first input optical fiber;
    the first output waveguide comprises a first output optical fiber;
    the second input waveguide comprises a second input optical fiber; and
    the second output waveguide comprises a second output optical fiber.

16. The optical switch of claim 1, wherein:

the input waveguide comprises a planar waveguide formed in a refractive material;

the first output waveguide comprises a planar waveguide formed in the refractive material; and the second output waveguide comprises an output optical fiber.

17. The optical switch of claim 10, wherein:

the first input waveguide comprises a planar waveguide formed in a refractive material;

the first output waveguide comprises a planar waveguide formed in the refractive material;

the second input waveguide comprises an input optical fiber; and the second output waveguide comprises an output optical fiber.

18. A method for processing an optical signal, comprising:

communicating an optical signal in a first waveguide;

totally internally reflecting the optical signal at a reflective surface of the first waveguide toward a second waveguide;

placing a third waveguide in proximal contact with the first waveguide to frustrate the total internal reflection of the optical signal; and receiving the optical signal in the third waveguide.

19. The method of claim 18, further comprising controllably varying the spacing between the third waveguide and the first waveguide to generate a first optical beam and a second optical beam.

20. The method of claim 18, wherein the step of placing the third waveguide further comprises actuating an actuator coupled to the third waveguide in response to a control signal.

21. The method of claim 18, wherein the step of communicating the optical signal in the first waveguide comprises communicating the optical signal such that the optical signal contacts the reflective surface at an input angle, and further comprising the step of receiving the optical signal in the second waveguide at an output angle determined based upon the input angle.

22. The method of claim 18, wherein the first waveguide comprises a longitudinal axis and the reflective surface is at an angle to a plane that is normal to the longitudinal axis.

23. The method of claim 22, wherein:

the third waveguide comprises a longitudinal axis and a contact surface that is substantially parallel to the reflective surface of the first waveguide when the longitudinal axis of the third waveguide is substantially aligned with the longitudinal axis of the first waveguide; and the step of placing the third waveguide in proximal contact with the first waveguide comprises placing the contact surface of the third waveguide in proximal contact with the reflective surface of the first waveguide.

24. The method of claim 18, wherein the second waveguide and the third waveguide are arranged in two dimensions.

25. The method of claim 18, wherein:

the first waveguide comprises an input optical fiber;

the second waveguide comprises a first output optical fiber; and the third waveguide comprises a second output optical fiber.

26. The method of claim 18, wherein:

the first waveguide comprises an input planar waveguide formed in a first refractive material;

the second waveguide comprises a first output planar waveguide formed in the first refractive material; and the third waveguide comprises a second output planar waveguide formed in a second refractive material.

27. The method of claim 26, wherein:

the first refractive material has a first index of refraction;

the input planar waveguide has a second index of refraction; and the second output planar waveguide has a third index of refraction substantially similar to the second index of refraction.

28. The method of claim 18, wherein:

the first waveguide comprises an input planar waveguide formed in a refractive material;

the second waveguide comprises an output planar waveguide formed in the refractive material; and the third waveguide comprises an output optical fiber.

29. An optical switch for processing an optical signal, comprising:

an input waveguide having a reflective surface;

a first output waveguide coupled to the input waveguide;

a second output waveguide; and a switching waveguide having a first position spaced apart from the reflective surface of the input waveguide such that the reflective surface totally internally reflects an optical signal toward the first output waveguide, and the switching waveguide having a second position in proximal contact with the reflective surface to frustrate the total internal reflection of the optical signal such that the switching waveguide communicates the optical signal toward the second output waveguide.

30. The optical switch of claim 29, wherein the optical signal contacts the reflective surface at an input angle and the first output waveguide receives the optical signal at an output angle determined based upon the input angle.

31. The optical switch of claim 29, wherein the input waveguide comprises a longitudinal axis and the reflective surface is at an angle to a plane that is normal to the longitudinal axis.

32. The optical switch of claim 31, wherein the switching waveguide comprises a longitudinal axis and a contact surface that is substantially parallel to the reflective surface of the input waveguide when the longitudinal axis of the switching waveguide is substantially aligned with the longitudinal axis of the input waveguide, the contact surface operable to contact proximally the reflective surface when the switching waveguide is placed in the second position.

33. The optical switch of claim 29, further comprising an actuator coupled to the switching waveguide and operable to position the switching waveguide in a selected one of the first position and the second position in response to a control signal.

34. The optical switch of claim 29, wherein the first output waveguide and the second output waveguide are arranged in two dimensions.

35. The optical switch of claim 29, wherein:

the input waveguide comprises an input optical fiber;

the first output waveguide comprises a first output optical fiber; and the second output waveguide comprises a second output optical fiber.

36. The optical switch of claim 35, wherein:
the input optical fiber comprises a first core having a first index of refraction and a cladding having a second index of refraction lower than the first index of refraction, the first core operable to communicate the optical signal such that it contacts the reflective surface at an input angle; and
the first output optical fiber comprises a second core operable to receive the optical signal at an output angle determined based upon the input angle and having a third index of refraction substantially similar to the first index of refraction.

37. The optical switch of claim 29, wherein the input waveguide comprises a first input waveguide and further comprising a second input waveguide coupled to the switching waveguide such that a contact surface of the switching waveguide totally internally reflects a second optical signal communicated by the second input waveguide when the switching waveguide is placed in the first position and such that the first output waveguide receives the second optical signal when the switching waveguide is placed in the second position.

38. An optical switch for processing an optical signal, comprising:
an input waveguide having a reflective surface;
a return-loop waveguide coupled to the input waveguide;
a first output waveguide coupled to the return-loop waveguide; and
a second output waveguide having a first position spaced apart from the reflective surface such that the reflective surface totally internally reflects an optical signal toward the return-loop waveguide for communication to the first output waveguide, and the second output waveguide having a second position in proximal contact with the reflective surface to frustrate the total internal reflection of the optical signal such that the second output waveguide receives the optical signal.

39. The optical switch of claim 38, wherein the reflective surface comprises a first reflective surface and the first output waveguide further comprises a second reflective surface, the optical switch further comprising a switching waveguide having a first position spaced apart from the second reflective surface such that the second reflective surface totally internally reflects the optical signal substantially along a longitudinal axis of the first output waveguide, and the switching waveguide having a second position in proximal contact with the second reflective surface.

40. The optical switch of claim 39, wherein the switching waveguide is placed in its first position when the second output waveguide is placed in its first position and the switching waveguide is placed in its second position when the second output waveguide is placed in its second position.

41. The optical switch of claim 38, wherein:
the input waveguide comprises an input optical fiber;
the return-loop waveguide comprises a return-loop optical fiber;
the first output waveguide comprises a first output optical fiber; and
the second output waveguide comprises a second output optical fiber.

42. The optical switch of claim 38, wherein the first output waveguide further comprises a second reflective surface, the return-loop waveguide comprises a first return-loop waveguide, and the optical switch further comprising:
a second return-loop waveguide coupled to the second output waveguide; and
a second input waveguide coupled to the second return-loop waveguide and having a contact surface, the second input waveguide further having a first position spaced apart from the second reflective surface of the first output waveguide such that the contact surface totally internally reflects a second optical signal toward the second return-loop waveguide for communication to the second output waveguide, and the second input waveguide having a second position in proximal contact with the second reflective surface of the first output waveguide to frustrate the total internal reflection of the second optical signal such that the first output waveguide receives the second optical signal.

43. The optical switch of claim 42, wherein the second input waveguide is placed in its first position when the second output waveguide is placed in its first position and the second input waveguide is placed in its second position when the second output waveguide is placed in its second position.

44. The optical switch of claim 42, wherein:
the second input waveguide comprises an input optical fiber;
the second return-loop waveguide comprises a second return-loop optical fiber;
the first output waveguide comprises a first output optical fiber; and
the second output waveguide comprises a second output optical fiber.

45. A method for processing an optical signal, comprising:
communicating an optical signal in an input waveguide;
totally internally reflecting the optical signal at a reflective surface of the input waveguide toward a return-loop waveguide for communication to a first output waveguide;
placing a second output waveguide in proximal contact with the input waveguide to frustrate the total internal reflection of the optical signal; and
receiving the optical signal in the second output waveguide.

46. The method of claim 45, wherein the reflective surface comprises a first reflective surface and the first output waveguide comprises a second reflective surface, the method further comprising:
placing a switching waveguide in a first position spaced apart from the second reflective surface such that the second reflective surface of the first output waveguide totally internally reflects the optical signal substantially along a longitudinal axis of the first output waveguide; and
placing the switching waveguide in a second position in proximal contact with the second reflective surface to frustrate the total internal reflection of the optical signal.

47. The method of claim 46, wherein the switching waveguide is spaced apart from the first output waveguide when the second output waveguide is spaced apart from the first input waveguide and the switching waveguide is placed in proximal contact with the first output waveguide when the second output waveguide is placed in proximal contact with the first input waveguide.

48. The method of claim 45, wherein:
the input waveguide comprises an input optical fiber;
the return-loop waveguide comprises a return-loop optical fiber;
the first output waveguide comprises a first output optical fiber; and the second output waveguide comprises a second output optical fiber.

49. The method of claim 45, wherein the first output waveguide further comprises a second reflective surface, the method further comprising:
- communicating a second optical signal in a second input waveguide;
- totally internally reflecting the second optical signal at a contact surface of the second input waveguide toward a second return-loop waveguide for communication to the second output waveguide;
- placing the second input waveguide in proximal contact with the second reflective surface of the first output waveguide to frustrate the total internal reflection of the second optical signal; and
- receiving the second optical signal in the first output waveguide.

50. The method of claim 49, wherein the second input waveguide is spaced apart from the first output waveguide when the second output waveguide is spaced apart from the first input waveguide and the second input waveguide is placed in proximal contact with the first output waveguide when the second output waveguide is placed in proximal contact with the first input waveguide.

51. The method of claim 49, wherein:
- the second input waveguide comprises an input optical fiber;
- the second return-loop waveguide comprises a second return-loop optical fiber;
- the first output waveguide comprises a first output optical fiber; and
- the second output waveguide comprises a second output optical fiber.

* * * * *